United States Patent [19]
Mellor

[11] 3,753,493
[45] Aug. 21, 1973

[54] ARTIFICIAL KIDNEY CLEANING APPARATUS

[76] Inventor: Eli K. Mellor, 305 Andover Dr., Burbank, Calif. 91504

[22] Filed: Apr. 23, 1971

[21] Appl. No.: 136,904

[52] U.S. Cl. .................................. 210/140, 210/321
[51] Int. Cl. ............................................. B01d 31/00
[58] Field of Search ...................... 210/138, 140, 22, 210/, 321, 206

[56] References Cited
UNITED STATES PATENTS

| | | | |
|---|---|---|---|
| 3,563,381 | 2/1971 | Edelson et al. .................. | 210/321 X |
| 3,462,361 | 8/1969 | Greenwalt et al. ............. | 210/446 X |
| 2,878,969 | 3/1959 | Griswold ........................... | 222/133 |
| 3,441,136 | 4/1969 | Serfass et al. .................... | 210/138 X |
| 3,352,779 | 11/1967 | Austin et al. ..................... | 210/321 X |

OTHER PUBLICATIONS
Pollard et al., "A Technique for Storage and Multiple Reuse of the Kill Dialyzer and Blood Tubing," from Vol. XIII, Trans. Amer. Soc. Artif. Int. Organs, June 16, 1967, pp. 24–28.

*Primary Examiner*—Frank A. Spear, Jr.
*Attorney*—White, Haefliger & Bachand

[57] ABSTRACT

Artificial kidney treatment apparatus comprises:
a. a clean water inlet,
b. inlet means for kidney treating liquid concentrate,
c. means to deliver the concentrate into a water stream being circulated to and through the kidney, whereby the kidney may be washed by aqueously diluted treating liquid, and
d. control means to control the sequential delivery of water flow to the kidney and dilute treating liquid flow to the kidney.

12 Claims, 6 Drawing Figures

PATENTED AUG 21 1973 3,753,493
SHEET 1 OF 2
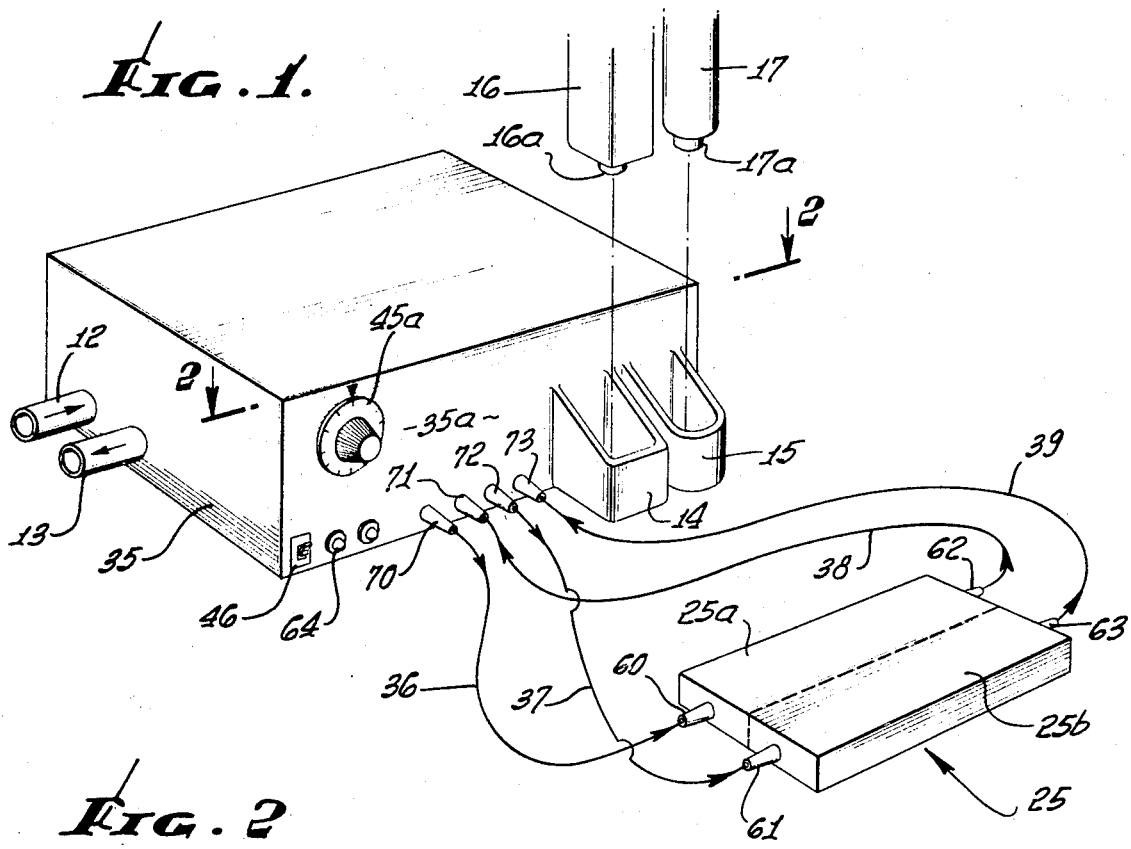
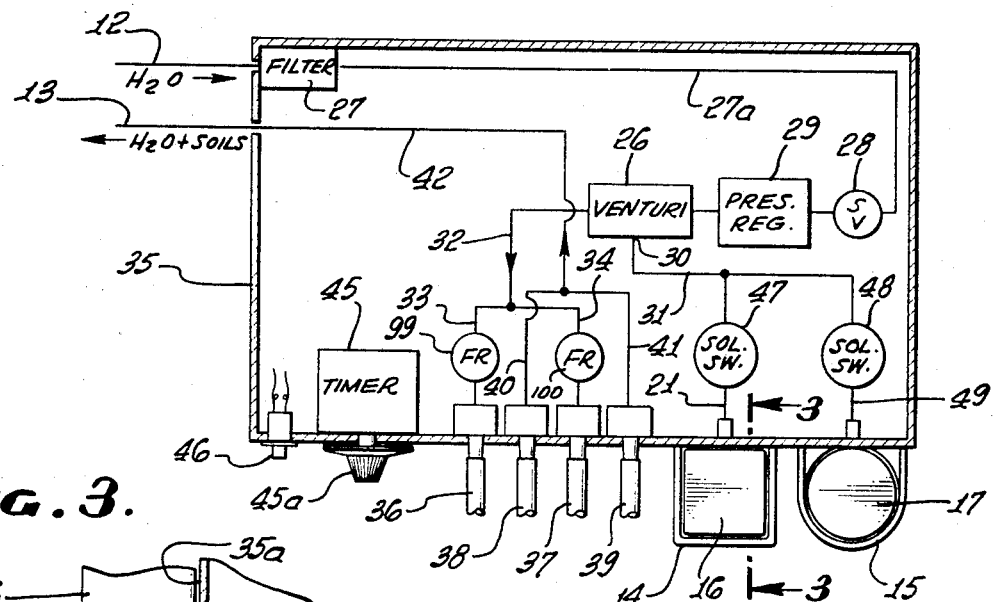
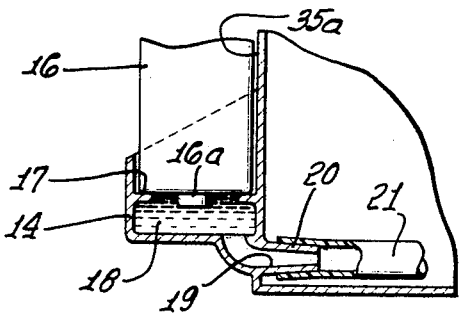
INVENTOR.
ELI K. MELLOR
BY
White, Haefliger & Bachand
ATTORNEYS.

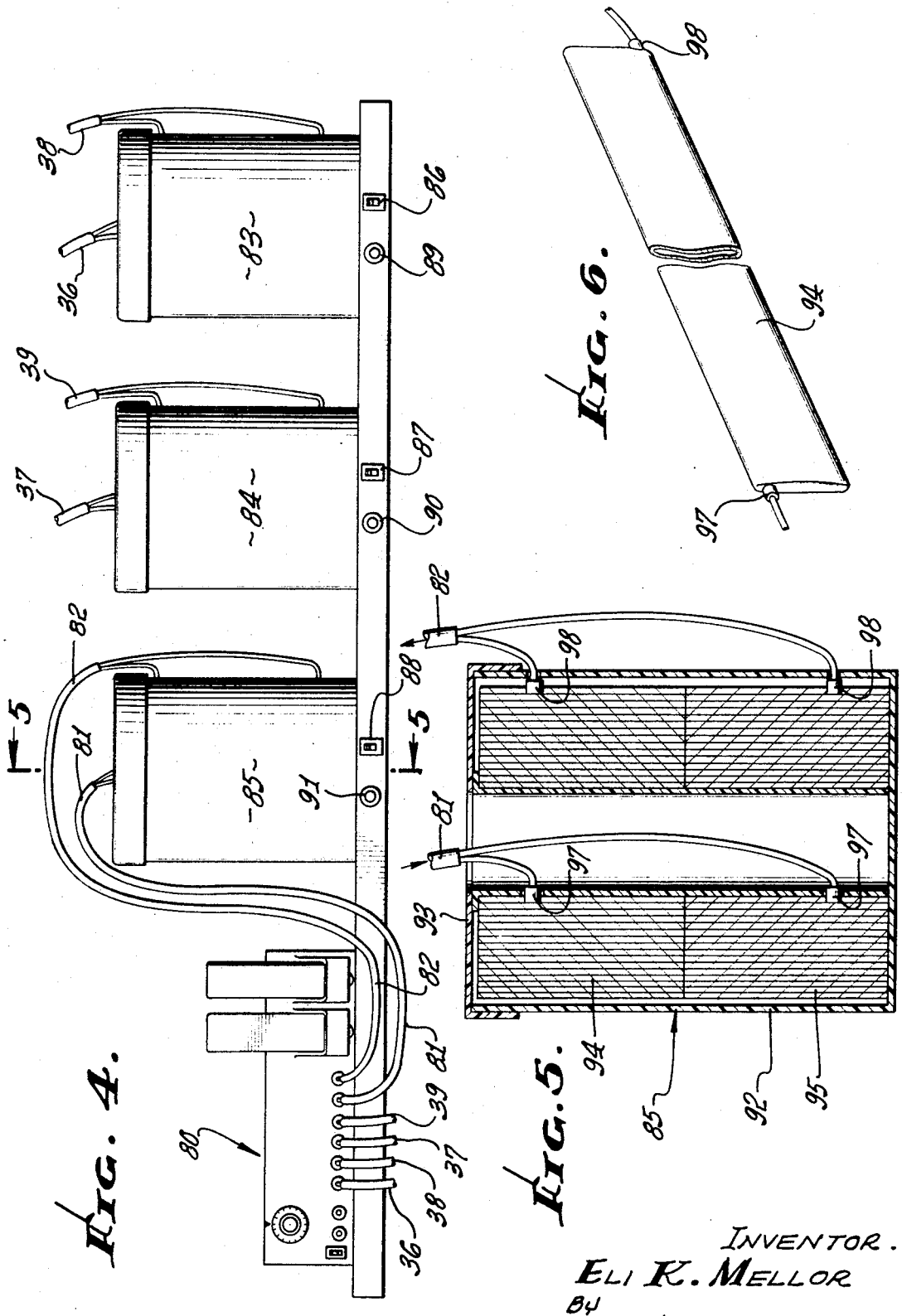

3,753,493

ARTIFICIAL KIDNEY CLEANING APPARATUS

BACKGROUND OF THE INVENTION

This invention relates generally to treatment of artificial kidneys, and more particularly concerns apparatus for automatically cleaning and/or sterilizing same.

In the past, the cleaning and sterilizing of artificial kidneys has been time consuming, expensive and subject to high risk of error, due to the number of steps and items of equipment required to be used. These circumstances made it extremely difficult if not impossible for out-patients to clean artificial kidneys while away from a treatment center, and as a result frequent replacement of filter elements has been resorted to; however, the cost of such frequent replacement is extremely high. No way was known to overcome these problems.

SUMMARY OF THE INVENTION

It is a major object of the invention to provide apparatus for solving the above problems as well as others encountered in the treatment of artificial kidneys. Basically, the apparatus includes a clean water inlet, a waste water outlet and inlet means for kidney treating liquid concentrate; means to deliver the concentrate into a water stream being circulated to and through the kidney and then to the outlet, whereby the kidney may be washed by aqueously diluted treating liquid; and, control means including a timer to control the sequential delivery of water flow to the kidney as well as controllably diluted treating liquid flow to and through the kidney. As will be seen, the concentrate inlet means is preferably defined by one or more upwardly opening receptacles sized to removably receive a concentrate container or containers from each of which treating concentrate is adapted to drain into its receptacle interior. The containers may be in the form of inverted plastic bottles received downwardly in the receptacles externally of a housing for the apparatus, and may contain cleaning and sterilizing liquid.

It is a further object of the invention to provide such delivery means in the form of a venturi or mixer to pass the clean, pressurized inlet water, together with ducting to communicate the receptacle interior or interiors with the venturi at a location such that concentrate liquid is drawn into the inlet water stream due to reduced pressure of the water stream in the venturi. The control means may include a valve or valves to control selected concentrate liquid flow to the venturi, and a timer responsive valve controller opens and closes the valve or valves at predetermined times controlled by the timer.

Other objects and advantages include adaptation of the apparatus to use with one or more artificial kidneys, of Kiil or coil type; portability of the apparatus; and ease of cleaning all tubing used with the apparatus.

These and other objects and advantages of the invention, as well as the details of an illustrative embodiment, will be more fully understood from the following description and drawings, in which:

DRAWING DESCRIPTION

FIG. 1 is a perspective showing of one form of apparatus embodying the invention;

FIG. 2 is a horizontal section taken in plan on lines 2—2 of FIG. 1;

FIG. 3 is an enlarged vertical section taken on lines 3—3 of FIG. 2;

FIG. 4 is an elevation showing use of the apparatus with multiple artificial kidneys;

FIG. 5 is an enlarged vertical section taken on line 5—5 of FIG. 4; and

FIG. 6 is a perspective showing of an expanded filtering element shown coiled in FIG. 5.

Referring to FIGS. 1 and 2, the artificial kidney cleaning apparatus includes structure having a clean water inlet 12, and a waste or contaminated water outlet 13, these being in the form of pipes as shown. The apparatus also has inlet means for kidney treating concentrate, such means for example being defined by a pair of upwardly opening receptacles 14 and 15. The latter are sized to loosely receive the inverted concentrate containers 16 and 17 respectively, each receptacle having porting, as at 16a and 17a to pass liquid concentrate draining from the container and into its receptacle. FIG. 3 shows plastic container 16 received in receptacle 14 and shouldering at surface 17, whereby treating liquid 18 drains into the lower interior 19 of the receptacle and then via outlet 20 to a duct 21. The receptacles 14 and 15 may advantageously consist of molded plastic which is transparent so that the extent of drainage of treating liquid from the translucent containers may be seen. Merely as illustrative, the containers may contain cleaning and sterilizing liquid, respectively.

The apparatus also includes means to deliver the concentrate into a water stream being circulated to and through the artificial kidney, seen for example at 25, and then to the outlet 13, whereby the kidney may be washed by appropriately diluted treating (cleaning or sterilizing) liquid. Such delivery means may typically include a venturi 26 to pass clean inlet water delivered via filter 27 and line 27a, solenoid controlled valve 28 and pressure regulator 29. A side inlet 30 to the venturi supplies treating liquid from line 31 for aspiration into and mixing with the supplied water, the mixture then flowing to the kidney 2525a and 25b via line 32, parallel lines 33 and 34 within housing 35, and parallel ducts 36 and 37 external to the housing.

Contaminated fluid exiting from the kidney sections via ducts 38 and 39 is passed via branch lines 40 and 41 within the housing to a line 42 for return to the outlet 13. Note that housing 35 contains elements 26, 27, 27a, 28, 29, 32–34, 40, 41 and certain additional elements to be discussed. Also, receptacles 14 and 15 are attached to or integral with the front panel 35a of the housing, as shown.

The apparatus further includes control means including a timer to control the sequential delivery of water flow, and selected dilute treating liquid flow to the kidney, as well as the initiation time and duration of such flows. In the illustrated example, a timer 45 including control knob 45a is carried by the front panel, and operable, when master switch 46 is turned on, to control such sequential delivery, initiation time and duration. Thus, the knob 45a may be rotated to a "START SEQUENCE" position, following which the timer 45 controls the sequencing, etc.; alternatively, the knob may be advanced to any stage in the sequence, for completion of the cycle. Solenoid controlled valves 47 and 48 in lines 21 and 49 respectively may be controlled by the timer to pass treating liquid first from one and later from the other of the containers 16 and 17 to the venturi or other mixer 26. Solenoid controlled valve 28 is also under the control of the timer, to open and pass the pressurized water stream to the venturi at the start of the cycle, that valve remaining open until the end of the cycle. Two-stage regulator 29 may also be controlled by the timer.

A typical sequence of flow to the kidney may be as follows:

1. Water circulated to kidney sections for first predetermined time interval;
2. A mixture of water and kidney cleaning solution circulates to kidney sections for a second predetermined time interval (the cleaning liquid conectrate may consist of detergent);
3. Same as 2, but pressure regulator shifted to second stage to supply water at higher pressure (for enhanced cleaning of kidney sections) for a third time interval;
4. Clean water circulated to kidney sections for a fourth time interval;
5. A mixture of water and kidney sterilizer solution circulates to kidney sections for a fifth time interval. (the sterilizer concentrate may for example consist of formaldehyde);
6. The knob 45a rotates to OFF position and timer 45 closes valve 28 to shut off water flow. The kidney may be elevated to assure completion of liquid drainage therefrom, after which ducts 36–39 may be pulled off the nozzles 60–63, in preparation for use of the kidney in blood dialysis. Glow lamp 64 turns off when switch 46 is thereafter turned off.

From the foregoing, it is clear that the kidney, shown to be of known "Kiil" type, may be automatically cleaned and sterilized, or otherwise treated, in a very simple and automatic (foolproof) manner, through use of the described equipment, the sequencing and duration times of all liquid treatments being automatically controlled. Also, the use of supply liquid containers 16 and 17 is reduced to utmost simplicity, so that the patient-user need only glance at the equipment to make sure that there is sufficient treating liquid for a kidney treatment before he starts the apparatus in a cycling sequence. Finally, ducts 36–39 may be cleaned after simple removal from nozzles 60–63 and 70–73.

Turning to FIG. 4, the apparatus 80 is the same as that described in FIGS. 1–3, excepting that three kidneys of "coil" type are to be treated as via liquid supply ducts 36, 37, 38 and 39, as before, plus additional ducts 81 and 82. Ducts 36 and 38 respectively conduct liquid to and from kidney 83; ducts 37 and 39 respectively conduct liquid to and from kidney 84; and ducts 81 and 82 respectively conduct liquid to and from kidney 85. Switches 86–88 control indicator lights 89–91 for convenience in indicating that selected kidneys are being treated.

FIG. 5 shows kidney 85 to comprise a receptacle 92 and top 93 therefor containing two kidney sections 94 and 95. Each of the latter comprises an element as seen in FIG. 6, but coiled as seen in FIG. 5, the element having an inlet 97 and outlet 98, whereby treating liquid is passed endwise through the coiled filter or dialysis material. Inlets 97 are connected to supply duct 81, and outlets 98 connected with return duct 82.

Referring again to FIG. 2, either of valves 99 and 100 may be closed when it is desired to use the apparatus to treat only one kidney.

I claim:

1. In artificial kidney treatment apparatus, the combination comprising:
    a. said apparatus having a clean water inlet,
    b. said apparatus also having an inlet means for kidney treating liquid concentrate,
    c. said apparatus including means to deliver the concentrate into a water stream being circulated to and through the kidney, whereby the kidney may be washed by aqueously diluted treated liquid, and
    d. automatic control means to effect and control the sequential and alternate delivery of water flow to the kidney and dilute treating liquid flow to the kidney, said control means including valving to control said concentrate liquid flow to said water stream, a timer and a timer responsive valve controller to open and close the valving.

2. In artificial kidney treatment apparatus, the combination comprising:
    a. said apparatus having a clean water inlet,
    b. said apparatus also having an inlet means for kidney treating liquid concentrate,
    c. said apparatus including means to deliver the concentrate into a water stream being circulated to and through the kidney, whereby the kidney may be washed by aqueously diluted treated liquid, and
    d. automatic control means to effect and control the sequential and alternate delivery of water flow to the kidney and dilute treating liquid flow to the kidney,
    e. said concentrate inlet means being defined by an upwardly opening receptacle sized to removably receive a concentrate container from which concentrate is adapted to drain into the receptacle interior, and wherein said delivery means includes a venturi to pass clean inlet water, there being ducting to communicate the receptacle interior with the venturi at a location such that concentrate liquid is drawn into the inlet water stream.

3. The combination of claim 2 including said container in the form of an inverted bottle received downwardly in the receptacle.

4. The combination of claim 2 wherein said control means includes a valve connected to control concentrate liquid flow from the receptacle to the venturi via said ducting, and a timer responsive valve controller to open and close the valve at times controlled by the timer.

5. The combination of claim 4 including a housing containing said control means, said receptacle being associated with the housing and openly upwardly exposed.

6. The combination of claim 4 including said artificial kidney, having blood flow ports and ducting connecting said kidney blood flow ports with said apparatus to sequentially pass said water flow and said dilute treating liquid flow to the kidney.

7. The combination of claim 6 wherein said kidney is of coil construction.

8. In artificial kidney treatment apparatus, the combination comprising:
    a. said apparatus having a clean water inlet,
    b. said apparatus also having an inlet means for kidney treating liquid concentrate,
    c. said apparatus including means to deliver the concentrate into a water stream being circulated to and through the kidney, whereby the kidney may be washed by aqueously diluted treated liquid, and
    d. automatic control means to effect and control the sequential and alternate delivery of water flow to the kidney and dilute treating liquid flow to the kidney, e. the concentrate inlet means being defined by a pair of upwardly opening receptacles each sized to receive a concentrate container from which concentrate is adapted to drain, each receptacle having porting to pass concentrate draining from the container received in that receptacle, and wherein said delivery means includes a venturi to pass clean inlet water, there being ducting to communicate the porting of each receptacle with the venturi at a location such that concentrate liquid is drawn into the inlet water stream, the control means including valves to control concentrate liquid flow from the receptacle porting to the venturi via said ducting, and a timer responsive valve controller to selectively open and close the valves at times controlled by the controller.

9. The combination of claim 8 including a two-stage water pressure regulator connected in series with said venturi to control the pressure of water delivered thereto, the controller controlling the regulator to increase water pressure delivery to the venturi when cleaning liquid is also delivered to the venturi from one of the containers.

10. The combination of claim 8 including said containers in said receptacles.

11. The combination of claim 10 wherein one container contains cleaning liquid and the other container contains sterilizer liquid.

12. In artificial kidney treatment apparatus, the combination comprising:
   a. said apparatus having a clean water inlet,
   b. said apparatus also having an inlet means for kidney treating liquid concentrate,
   c. said apparatus including means to deliver the concentrate into a water stream being circulated to and through the kidney, whereby the kidney may be washed by aqueously diluted treated liquid, and
   d. automatic control means to effect and control the sequential and alternate delivery of water flow to the blood compartment of the kidney and dilute treating liquid flow to the kidney,
   e. and including said artificial kidney disconnected from a patient, said kidney having blood flow ports connectible with a patient, and ducting connecting said kidney blood flow ports with said apparatus to sequentially pass said water flow and said dilute treating liquid flow to the kidney.

* * * * *